(12) United States Patent
Ganesan (10) Patent No.: US 8,296,812 B1
(45) Date of Patent: Oct. 23, 2012

(54) STREAMING VIDEO USING ERASURE ENCODING

(75) Inventor: Prasanna Ganesan, Menlo Park, CA (US)

(73) Assignee: Vudu, Inc., Santa Clara, CA (US)

( * ) Notice: Subject to any disclaimer, the term of this patent is extended or adjusted under 35 U.S.C. 154(b) by 388 days.

(21) Appl. No.: 11/515,267

(22) Filed: Sep. 1, 2006

(51) Int. Cl.
*H04N 7/173* (2011.01)
(52) U.S. Cl. ............... 725/95; 725/8; 725/87; 725/88; 725/90; 725/97; 725/101
(58) Field of Classification Search ............... 725/86, 725/87, 88, 90, 95, 97, 101
See application file for complete search history.

(56) References Cited

U.S. PATENT DOCUMENTS

| | | | |
|---|---|---|---|
| 5,132,992 A | | 7/1992 | Yurt et al. |
| 5,414,455 A | | 5/1995 | Hooper et al. |
| 5,602,918 A | | 2/1997 | Chen et al. |
| RE35,651 E | | 11/1997 | Bradley et al. |
| 5,694,559 A | | 12/1997 | Hobson et al. |
| 5,701,582 A | | 12/1997 | DeBey |
| 5,721,878 A | * | 2/1998 | Ottesen et al. ............... 725/87 |
| 5,729,280 A | | 3/1998 | Inoue et al. |
| 5,761,417 A | * | 6/1998 | Henley et al. ............... 709/231 |
| 5,765,164 A | | 6/1998 | Prasad et al. |
| 5,802,283 A | | 9/1998 | Grady et al. |
| 5,815,146 A | | 9/1998 | Youden et al. |
| 5,815,662 A | | 9/1998 | Ong |
| 5,826,168 A | | 10/1998 | Inoue et al. |
| 5,831,662 A | | 11/1998 | Payton |
| 5,838,314 A | | 11/1998 | Neel et al. |
| 5,877,812 A | | 3/1999 | Krause et al. |
| 5,884,031 A | | 3/1999 | Ice |
| 5,903,563 A | | 5/1999 | Rashid et al. |

(Continued)

FOREIGN PATENT DOCUMENTS

| | | |
|---|---|---|
| WO | WO 97/016023 | 5/1997 |

(Continued)

OTHER PUBLICATIONS

U.S. Appl. No. 11/150,653, filed Jun. 11, 2005, Ganesan et al.

(Continued)

*Primary Examiner* — Pankaj Kumar
*Assistant Examiner* — Sahar Baig
(74) *Attorney, Agent, or Firm* — Stevens Law Group; David R. Stevens (57) ABSTRACT

A system, apparatus and method for presenting a movie on demand over a network is described. According to one system and method, the network has one or more nodes, portions of a video being encoded as encoded portions each having sections, the sections for each encoded portion being distributed among segments, the segments being distributed among the one or more nodes; an apparatus including a network interface is coupled to the network; a control system is coupled to the network interface and configured to initiate a movie request and to communicate with a subset of the one or more nodes to receive a subset of the segments; and a decoder coupled to the network interface and configured to decode a subset of the sections so that less than all of the sections are used to play back the movie; and a presentation device coupled to the apparatus, the presentation device presenting the portions of the video. Each portion of the movie is played back, in its entirety, without using all of the sections of that portion.

18 Claims, 8 Drawing Sheets

U.S. PATENT DOCUMENTS

| | | | |
|---|---|---|---|
| 5,926,205 | A | 7/1999 | Krause et al. |
| 5,928,331 | A | 7/1999 | Bushmitch |
| 5,933,603 | A | 8/1999 | Vahalia et al. |
| 5,948,070 | A | 9/1999 | Fujita |
| 6,018,359 | A | 1/2000 | Kermode et al. |
| 6,037,983 | A | 3/2000 | Au et al. |
| 6,038,560 | A | 3/2000 | Wical |
| 6,055,314 | A | 4/2000 | Spies et al. |
| 6,124,854 | A * | 9/2000 | Sartain et al. ................. 715/716 |
| 6,138,221 | A | 10/2000 | Korst et al. |
| 6,170,006 | B1 | 1/2001 | Namba |
| 6,184,878 | B1 | 2/2001 | Alonso et al. |
| 6,212,549 | B1 | 4/2001 | Page et al. |
| 6,236,504 | B1 | 5/2001 | Kao et al. |
| 6,263,504 | B1 | 7/2001 | Ebisawa |
| 6,324,519 | B1 | 11/2001 | Eldering |
| 6,334,124 | B1 | 12/2001 | Bouchard et al. |
| 6,397,251 | B1 | 5/2002 | Graf |
| 6,463,508 | B1 | 10/2002 | Wolf et al. |
| 6,502,139 | B1 * | 12/2002 | Birk et al. ...................... 709/233 |
| 6,519,693 | B1 * | 2/2003 | Debey .......................... 712/201 |
| 6,614,366 | B2 | 9/2003 | Luby |
| 6,622,305 | B1 | 9/2003 | Willard |
| 6,630,963 | B1 | 10/2003 | Billmaier |
| 6,640,241 | B1 | 10/2003 | Ozzie et al. |
| 6,701,528 | B1 | 3/2004 | Arsenault et al. |
| 6,704,813 | B2 | 3/2004 | Smirnov et al. |
| 6,728,763 | B1 | 4/2004 | Chen |
| 6,731,605 | B1 | 5/2004 | Deshpande |
| 6,763,392 | B1 | 7/2004 | del Val et al. |
| 6,789,106 | B2 | 9/2004 | Eyer et al. |
| 6,801,947 | B1 | 10/2004 | Li |
| 6,804,719 | B1 | 10/2004 | Cabrera et al. |
| 6,857,012 | B2 | 2/2005 | Sim et al. |
| 6,934,965 | B2 | 8/2005 | Gordon et al. |
| 6,938,258 | B1 | 8/2005 | Weinberger et al. |
| 6,944,585 | B1 | 9/2005 | Pawson |
| 6,970,937 | B1 | 11/2005 | Huntington |
| 6,973,667 | B2 | 12/2005 | Fritsch |
| 7,051,360 | B1 | 5/2006 | Ellis et al. |
| 7,080,400 | B1 * | 7/2006 | Navar .......................... 725/139 |
| 7,110,006 | B2 | 9/2006 | MacInnis et al. |
| 7,155,735 | B1 * | 12/2006 | Ngo et al. ..................... 725/101 |
| 7,174,385 | B2 | 2/2007 | Li |
| 7,188,357 | B1 * | 3/2007 | Rieschl et al. .................. 725/92 |
| 7,191,215 | B2 | 3/2007 | Ganesan et al. |
| 7,228,556 | B2 | 6/2007 | Beach et al. |
| 7,240,359 | B1 | 7/2007 | Sie et al. |
| 7,246,369 | B1 | 7/2007 | Duan et al. |
| 7,260,829 | B1 | 8/2007 | Hendricks et al. |
| 7,324,555 | B1 | 1/2008 | Chen et al. |
| 7,360,235 | B2 | 4/2008 | Davies et al. |
| 7,379,963 | B1 | 5/2008 | Khare et al. |
| 7,386,874 | B2 | 6/2008 | White et al. |
| 7,552,382 | B1 * | 6/2009 | Munetsugu et al. .......... 715/204 |
| 7,577,750 | B2 | 8/2009 | Shen et al. |
| 7,633,887 | B2 | 12/2009 | Panwar et al. |
| 7,810,647 | B2 | 10/2010 | Ganesan et al. |
| 2001/0019630 | A1 | 9/2001 | Johnson |
| 2001/0042249 | A1 | 11/2001 | Knepper et al. |
| 2001/0051998 | A1 * | 12/2001 | Henderson .................... 709/217 |
| 2002/0012521 | A1 * | 1/2002 | Nagasaka et al. ............... 386/46 |
| 2002/0022956 | A1 | 2/2002 | Ukrainczyk |
| 2002/0029282 | A1 | 3/2002 | Buddhikot et al. |
| 2002/0031331 | A1 | 3/2002 | Kwoh et al. |
| 2002/0053078 | A1 | 5/2002 | Holtz et al. |
| 2002/0091825 | A1 * | 7/2002 | Shuster ......................... 709/226 |
| 2002/0129375 | A1 | 9/2002 | Kim et al. |
| 2002/0131423 | A1 | 9/2002 | Chan et al. |
| 2002/0133491 | A1 | 9/2002 | Sim et al. |
| 2002/0143959 | A1 | 10/2002 | El-Baze et al. |
| 2002/0154703 | A1 * | 10/2002 | Kubota et al. ................. 375/260 |
| 2002/0154892 | A1 | 10/2002 | Hoshen et al. |
| 2002/0162109 | A1 | 10/2002 | Shteyn |
| 2002/0163882 | A1 | 11/2002 | Bornstein et al. |
| 2003/0026254 | A1 | 2/2003 | Sim |
| 2003/0028490 | A1 | 2/2003 | Miura et al. |
| 2003/0055893 | A1 | 3/2003 | Sato et al. |
| 2003/0078964 | A1 | 4/2003 | Parrella et al. |
| 2003/0084461 | A1 | 5/2003 | Hoang |
| 2003/0097661 | A1 * | 5/2003 | Li et al. ........................ 725/109 |
| 2003/0126277 | A1 | 7/2003 | Son et al. |
| 2003/0135867 | A1 | 7/2003 | Guedalia |
| 2003/0163646 | A1 | 8/2003 | O'Neil |
| 2003/0188316 | A1 | 10/2003 | DePrez |
| 2003/0188317 | A1 | 10/2003 | Liew et al. |
| 2003/0204613 | A1 | 10/2003 | Hudson et al. |
| 2003/0204856 | A1 * | 10/2003 | Buxton ......................... 725/120 |
| 2003/0208612 | A1 | 11/2003 | Harris et al. |
| 2004/0016000 | A1 | 1/2004 | Zhang et al. |
| 2004/0078460 | A1 | 4/2004 | Valavi et al. |
| 2004/0107242 | A1 | 6/2004 | Vert et al. |
| 2004/0123324 | A1 | 6/2004 | Sazzad et al. |
| 2004/0128343 | A1 | 7/2004 | Mayer |
| 2004/0133923 | A1 | 7/2004 | Watson et al. |
| 2004/0143672 | A1 | 7/2004 | Padmanabham et al. |
| 2004/0143850 | A1 * | 7/2004 | Costa ........................... 725/115 |
| 2004/0148634 | A1 | 7/2004 | Arsenault et al. |
| 2004/0148636 | A1 | 7/2004 | Weinstein et al. |
| 2004/0158867 | A1 * | 8/2004 | Mack et al. ..................... 725/95 |
| 2004/0202073 | A1 | 10/2004 | Lai et al. |
| 2004/0236869 | A1 | 11/2004 | Moon |
| 2004/0250286 | A1 | 12/2004 | Fraser et al. |
| 2004/0255323 | A1 | 12/2004 | Varadarajan et al. |
| 2004/0267822 | A1 | 12/2004 | Curran et al. |
| 2005/0010653 | A1 | 1/2005 | McCanne |
| 2005/0015511 | A1 * | 1/2005 | Izmailov et al. ............... 709/238 |
| 2005/0033856 | A1 | 2/2005 | Li |
| 2005/0038724 | A1 | 2/2005 | Roever et al. |
| 2005/0041679 | A1 | 2/2005 | Weinstein et al. |
| 2005/0055425 | A1 | 3/2005 | Lango et al. |
| 2005/0055718 | A1 | 3/2005 | Stone |
| 2005/0066063 | A1 | 3/2005 | Grigorovitch et al. |
| 2005/0086696 | A1 | 4/2005 | Daniels |
| 2005/0097213 | A1 | 5/2005 | Barrett et al. |
| 2005/0108414 | A1 | 5/2005 | Taylor et al. |
| 2005/0177853 | A1 | 8/2005 | Williams et al. |
| 2005/0216941 | A1 | 9/2005 | Flanagan et al. |
| 2005/0259682 | A1 * | 11/2005 | Yosef et al. ................... 370/468 |
| 2005/0267948 | A1 * | 12/2005 | McKinley et al. ............ 709/217 |
| 2006/0008256 | A1 | 1/2006 | Khedouri et al. |
| 2006/0026663 | A1 | 2/2006 | Kortum et al. |
| 2006/0031537 | A1 | 2/2006 | Boutboul et al. |
| 2006/0034537 | A1 | 2/2006 | Masaki |
| 2006/0037037 | A1 | 2/2006 | Miranz |
| 2006/0075453 | A1 | 4/2006 | Choi |
| 2006/0095948 | A1 | 5/2006 | Verhaegh et al. |
| 2006/0106807 | A1 | 5/2006 | DeVitis et al. |
| 2006/0136597 | A1 | 6/2006 | Shabtai et al. |
| 2006/0174160 | A1 | 8/2006 | Kim |
| 2006/0184688 | A1 | 8/2006 | Ganguly et al. |
| 2006/0190615 | A1 | 8/2006 | Panwar et al. |
| 2006/0190975 | A1 | 8/2006 | Gonzalez |
| 2006/0206889 | A1 | 9/2006 | Ganesan et al. |
| 2006/0218217 | A1 | 9/2006 | Ganesan et al. |
| 2006/0242153 | A1 | 10/2006 | Newberry et al. |
| 2007/0089146 | A1 | 4/2007 | Ikeda et al. |
| 2007/0143804 | A1 * | 6/2007 | Wang .............................. 725/95 |
| 2008/0022343 | A1 | 1/2008 | Hodzic et al. |
| 2008/0091840 | A1 | 4/2008 | Guo et al. |
| 2008/0134258 | A1 * | 6/2008 | Goose et al. ..................... 725/91 |
| 2008/0148323 | A1 | 6/2008 | White et al. |
| 2008/0212945 | A1 | 9/2008 | Khedouri et al. |
| 2008/0256272 | A1 | 10/2008 | Kampmann et al. |
| 2008/0281913 | A1 | 11/2008 | Shankar et al. |
| 2008/0282036 | A1 | 11/2008 | Ganesan |
| 2008/0282298 | A1 | 11/2008 | Ganesan et al. |
| 2008/0301738 | A1 | 12/2008 | Davies et al. |
| 2009/0007196 | A1 | 1/2009 | Ganesan |
| 2009/0019174 | A1 | 1/2009 | Ehn et al. |
| 2009/0019468 | A1 | 1/2009 | Ganesan et al. |
| 2009/0024573 | A1 | 1/2009 | Zink |
| 2009/0025046 | A1 | 1/2009 | Ganesan et al. |
| 2009/0025048 | A1 | 1/2009 | Ganesan |
| 2010/0049867 | A1 | 2/2010 | Panwar et al. |
| 2010/0223362 | A1 | 9/2010 | Price |
| 2010/0254675 | A1 | 10/2010 | Ganesan |

| | | | |
|---|---|---|---|
| 2011/0023072 | A1 | 1/2011 | Hodzic et al. |
| 2011/0093492 | A1 | 4/2011 | Sull et al. |
| 2011/0179449 | A1 | 7/2011 | Ganesan et al. |

FOREIGN PATENT DOCUMENTS

| | | |
|---|---|---|
| WO | WO 01/024526 | 4/2001 |
| WO | WO 03/041383 | 5/2003 |

OTHER PUBLICATIONS

U.S. Appl. No. 11/404,972, filed Apr. 13, 2006, Ganesan.

U.S. Appl. No. 11/927,690, filed Oct. 30, 2007, Ganesan et al.

Video-on-Demand Research, printable at http:llwww.cs. ndsu. nodak.edu/-rvetterlATM/html/video. html.

C. Siva Ram Murthy "A Primary-Segmented Backup Scheme for Fast Restoration of Real-Time Channels from Network Component Failures", printable at http://www.prl.ernet.in/-library/Hari200m/Hari%200 m%20Lecture/Siva%20Ram%20Murthy final.html.

Clifford A. Shaffer, A Practical Introduction to Data Structures and Algorithm Analysis Java Edition, 1998, 11 pgs.

Decision on Petition to Make Special dated Apr. 16, 2005 in U.S. Appl. No. 11/077,411, 1 pg.

Decision on Petition to Make Special dated Dec. 18, 2007 in U.S. Appl. No. 11/974,138, 2 pgs.

Decision on Petition to Make Special dated Nov. 29, 2005 in U.S. Appl. No. 11/075,573, 1 pg.

Final Office Action dated Dec. 29, 2008 in U.S. Appl. No. 11/210,272, 19 pgs.

Final Office Action dated Apr. 24, 2006 in U.S. Appl. No. 11/077,411, 7 pgs.

Final Office Action dated Dec. 3, 2008 in U.S. Appl. No. 11/458,384, 24 pgs.

Final Office Action dated Aug. 31, 2009 in U.S. Appl. No. 11/492,673, 16 pgs.

Final Office Action dated Mar. 18, 2008 in U.S. Appl. No. 11/075,573, 18 pgs.

Final Office Action dated Aug. 31, 2009 in U.S. Appl. No. 11/278,416, 15 pgs.

Final Office Action dated Aug. 14, 2009 in U.S. Appl. No. 11/150,653, 27 pgs.

Francois, Alexandre R.J., "A Hybrid Architectural Style for Distributed Parallel Processing of Generic Data Streams" May 2004, IEEE Computer Society, ICSE '04: Proceedings of the 26th International Conference on Software Engineering, pp. 1-10.

Guo, Yang et al., "P2Cast: Peer-to-peer Patching Scheme for VoD Service" May 2003, ACM, WWW '03: Proceedings of the 12th international conference on World Wide Web, pp. 301-309.

International Preliminary Report on Patentability and Written Opinion in the International Application PCT/US2005/020051, World Intellectual Property Organization, European Patent Office, Apr. 3, 2007, 4 pages.

International Preliminary Report on Patentability and Searching Authority in the International Application PCT/US2006/007070, World IntellectualProperty Organization, European Patent Office, Sep. 12,2007,7 pages, Written Opinion of the International.

International Search Report and Written Opinion of the International Searching Authority inInternational Application PCT/US2006/007070, European Patent Office, Feb. 27,2006, 12 pages.

International Search Report and Written Opinion of the International Searching Authority inInternational Application PCT/US2008/071735, European Patent Office, Feb. 19, 2009, 11 pages.

International Search Report International Searching Authority inInternational Application PCT/US2005/020051, European Patent Office, Mar. 9, 2007, 3 pages.

International Search Report and Written Opinion of the International Searching Authority inInternational Application PCT/US2006/007070, European Patent Office, Apr. 19, 2007, 9 pages.

Jim Ferrara, Creating and Maintaining a Hierarchical Directory, Nov. 2002, 14 pgs.

Lisa Payne, Web Authoring Inline Images, Jan. 2002, 4 pgs.

Non-Final Office Action dated Mar. 11, 2009 in U.S. Appl. No. 11/492,673, 12 pgs.

Non-Final Office Action dated Dec. 26, 2008 in U.S. Appl. No. 11/150,653, 26 pgs.

Non-Final Office Action dated Sep. 23, 2008 in U.S. Appl. No. 11/684,637, 5 pgs.

Non-Final Office Action dated Jul. 20, 2009 in U.S. Appl. No. 11/930,147, 14 pgs.

Non-Final Office Action dated Jul. 2, 2009 in U.S. Appl. No. 11/331,113, 10 pgs.

Non-Final Office Action dated Oct. 28, 2008 in U.S. Appl. No. 10/867,155, 12 pgs.

Non-Final Office Action dated May 13, 2009 in U.S. Appl. No. 11/685,101, 10 pgs.

Non-Final Office Action dated Jan. 30, 2006 in U.S. Appl. No. 11/077,411, 6 pgs.

Non-Final Office Action dated Aug. 28, 2006 in U.S. Appl. No. 11/077,411, 10 pgs.

Non-Final Office Action dated Jun. 30, 2008 in U.S. Appl. No. 11/075,573, 19 pgs.

Non-Final Office Action dated Jun. 20, 2008 in U.S. Appl. No. 11/210,272, 16 pgs.

Non-Final Office Action dated Apr. 29, 2008 in U.S. Appl. No. 11/458,384, 24 pgs.

Non-Final Office Action dated Mar. 13, 2009 in U.S. Appl. No. 11/278,416, 9 pgs.

Non-Final Office Action dated Jun. 11, 2009 in U.S. Appl. No. 11/210,272, 23 pgs.

Non-Final Office Action dated Nov. 25, 2008 in U.S. Appl. No. 11/075,573, 18 pgs.

Non-Final Office Action dated Oct. 17, 2007 in U.S. Appl. No. 11/075,573, 13 pgs.

Notice of Allowance dated Aug. 27, 2009 in U.S. Appl. No. 11/684,637, 3 pgs.

Notice of Allowance dated Jan. 16, 2007 in U.S. Appl. No. 11/077,411, 4 pgs.

Paris et al.: "Zero-delay broadcasting protocols for video-on-demand", ACM Multimedia, Proceedings of the International Conference, New York, NY, US, Oct. 30, 1999, 9 pages.

Petition to Make Special dated Mar. 9, 2005 in U.S. Appl. No. 11/077,411, 52 pgs.

Petition to Make Special dated Oct. 10, 2007 in U.S. Appl. No. 11/974,138, 9 pgs.

Petition to Make Special dated Oct. 31, 2005 in U.S. Appl. No. 11/075,573, 16 pgs.

Video-on-Demand Research, from http://www.cs.ndsu.nodak.edu/-rvetterlATM/html/video.html, dated Oct. 31, 2005, North Dakota State University, Computer Science Department, 2 pgs.

C. Siva Ram Murthy "A Primary-Segmented Backup Scheme for Fast Restoration of Real-Time Channels from Network Component Failures", from http://www.prl.ernet.in/-library/Hari%200m/Hari%200m%20Lecture/Siva%/20Ram%20Murthy final.html, dated Oct. 31, 2005, Indian Institute of Technology, Department ofComputer Science and Engineering, 8 pgs.

Election/Restriction Requirement dated Oct. 28, 2009 in U.S. Appl. No. 11/404,972, 6 pgs.

Final Office Action date Jan. 21, 2010 in U.S. Appl. No. 11/075,573,24pages.

Final Office Action dated Sep. 30, 2009 in U.S. Appl. No. 11/269,462, 27 pgs.

Final Office Action date Aug. 4, 2009 in U.S. Appl. No. 11/076,214, 16 pages.

Final Office Action date May 5, 2010 in U.S. Appl. No. 11/269,462, 10 pages.

Final Office Action Mar. 18, 2010 in U.S. Appl. No. 11/331,113 15pages.

Final Office Action date Mar. 26, 2010 in U.S. Appl. No. 11/930,147, 13 pages.

International Preliminary Report on Patentability and Written Opinion of the International Searching Authority in International Application PCT/US2008/071735, European Patent Office, Feb. 11, 2010, 7 pages.

Non-Final Office Actipn Mar. 12, 2010 in U.S. Appl. No. 11/150,653 29pages.

Non-Final Office Action date Mar. 4, 2010 in U.S. Appl. No. 11/076,214, 13 pages.
Non-Final Office Action dated Dec. 16, 2009 in U.S. Appl. No. 11/684,637, 5 pgs.
Non-Final Office Action dated Dec. 1, 2009 in U.S. Appl. No. 11/831,938, 16 pgs.
Non-Final Office Action date Mar. 24, 2010 in U.S. Appl. No. 11/404,972, 10 pages.
Non-Final Office Action date Apr. 12, 2010 in U.S. Appl. No. 11/492,673, 11 pages.
Non-Final Office Action date Dec. 23, 2008 in U.S. Appl. No. 11/076,214, 19 pages.
Notice of Allowance dated Nov. 2, 2009 in U.S. Appl. No. 11/685,101, 6 pgs.
Final Office Action dated Oct. 14, 2010 in U.S. Appl. No. 11/076,214, 12 pages.
Final Office Action dated Sep. 28, 2010 in U.S. Appl. No. 11/492,673, 12 pages.
Final Office Action dated Sep. 17, 2010 in U.S. Appl. No. 11/150,653; 31 pages.
Final Office Action date Aug. 31, 2010 in U.S. Appl. No. 11/831,938; 29 pages.
Notice of Allowance dated Jun. 10, 2010 in U.S. Appl. No. 11/684,637; 8 pages.
U.S. Appl. No. 60/646,080 Specification, Panwar, Jan. 2005.
Communication of Dec. 16, 2010 in European Application No. 08796939.0-1244.
Final Office Action dated Aug. 30, 2011 in U.S. Appl. No. 11/492,673.
Final Office Action dated Jul. 22, 2011 in U.S. Appl. No. 11/075,573.
Ma et al., "Reducing bandwidth requirement for delivering video over wide area networks with proxy server", IEEE, 2002, vol. 4, Iss. 4, p. 539-550.
Non-Final Office Action dated Jul. 8, 2011 in U.S. Appl. No. 11/831,938.
Non-Final Office Action dated Apr. 21, 2011 in U.S. Appl. No. 11/278,416.
Non-Final Office Action dated Mar. 14, 2011 in U.S. Appl. No. 11/492,673, 15 pages.
Non-Final Office Action dated Mar. 14, 2011 in U.S. Appl. No. 11/150,653.
Non-Final Office Action dated Feb. 25, 2011 in U.S. Appl. No. 11,075,573, 27 pages.
Notice of Allowance mailed Sep. 13, 2011 in U.S. Appl. No. 11/150,653.
Ramesh et al., "Multicast with cache (Mcache): an adaptive zero-delay video-on-demand service", IEEE, 2001. vol. 11, Iss. 3; p. 440-456.

* cited by examiner

STREAMING VIDEO USING ERASURE ENCODING

BACKGROUND

1. Field

Embodiments described herein relates generally to the field of video systems. More particularly, the disclosure relates to a system, apparatus and method for streaming videos.

2. Description of the Related Art

Video on Demand (VOD) systems allow users to request and view videos over a network.

In some VOD systems, a user requests a video using a box (e.g., a set-top receiver) connected through a network to a server farm. In response to a video request, the server farm "streams" the selected video to the box. The video is presented to the user while the rest of the video is being downloaded. As the number of boxes in the network increases, the bandwidth capacity required at the server farm increases.

In other VOD systems, a video library is distributed among the boxes of multiple users. When a user requests a video using their box, the request is serviced over the network by one of the boxes that store the requested video. This peer-to-peer network distributes the bandwidth requirements across the boxes on the network. As the number of boxes in the network increases, the quantity of videos requested increases but the bandwidth capacity also increases since there are more boxes to service the video requests.

However, the capacity to serve a particular video is limited, since a predetermined number of copies of that video are distributed among a fixed number of boxes. Each box has limited bandwidth capacity to serve the video(s) stored in that box. Thus, the peer-to-peer configuration restricts the flexibility to concurrently deliver quantities of particular videos.

In other VOD systems, the entire video is downloaded to the box before it is presented on the user's video system. By lengthening the period over which the video is downloaded, the bandwidth requirements can be reduced whether using a centralized server or a peer-to-peer network. However, the longer download period increases the delay from the time the user requests a video to when that user can watch the requested video.

What is needed is a VOD system that allows a video to be watched soon after the request. What is also needed is a VOD system that allows more flexibility in terms of capacity to concurrently serve particular videos to multiple users. What is further needed is a VOD system that can scale in terms of the number of boxes being served while limiting the increase in bandwidth requirements.

SUMMARY

A system for streaming a movie on demand is described. According to one embodiment, portions of a movie are encoded into encoded portions each having sections, the sections for each encoded portion being distributed among segments. The system includes an apparatus including a network interface coupled to the one or more nodes; a control system coupled to the network interface and configured to initiate a movie request and communicate with the one or more nodes to receive a subset of the segments; and a decoder coupled to the network interface and configured to decode a subset of the sections so that less than all of the sections are used to play back the portions of the movie. A presentation device coupled to the apparatus is configured to present the portions in playing back (i) the movie in it's entirety, and (ii) each portion of the movie, in its entirety, without using all of the sections of that portion.

An apparatus for streaming a movie on demand is described including a network interface; a control system coupled to the network interface and configured to send a movie request and communicate with one or more nodes; a decoder coupled to the network interface and configured to decode a subset of a set of sections so that less than all of the sections are used to play back a portion of the movie, the subset of the set of sections for each of the set of encoded portions being assembled from a subset of a plurality of segments; and a video interface coupled to the decoder and configured to transmit the set of portions in playing back (i) the movie in its entirety, and (ii) each portion of the movie, in its entirety, without using all of the sections of that portion are assembled.

A method of processing a movie over a network is described including encoding each of a plurality of portions of the movie to generate a plurality of encoded portions each having a plurality of sections; distributing each plurality of sections among a plurality of segments; requesting the movie; identifying one or more nodes storing a subset of the plurality of segments; receiving a subset of the plurality of sections for each of the plurality of encoded portions from the one or more nodes; and decoding each subset of the plurality of sections so that less than all of the sections are used to play back the movie. A particular portion of the movie is played back without using all of the sections for that particular portion.

BRIEF DESCRIPTION OF THE DRAWINGS

These and other features, aspects, and advantages of the present invention will become better understood with regard to the following description, appended claims, and accompanying drawings where:

DETAILED DESCRIPTION OF PREFERRED EMBODIMENTS

Described below is a system and method for streaming video. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown in the figures to avoid obscuring the underlying principles of the present invention.

Figure 1:
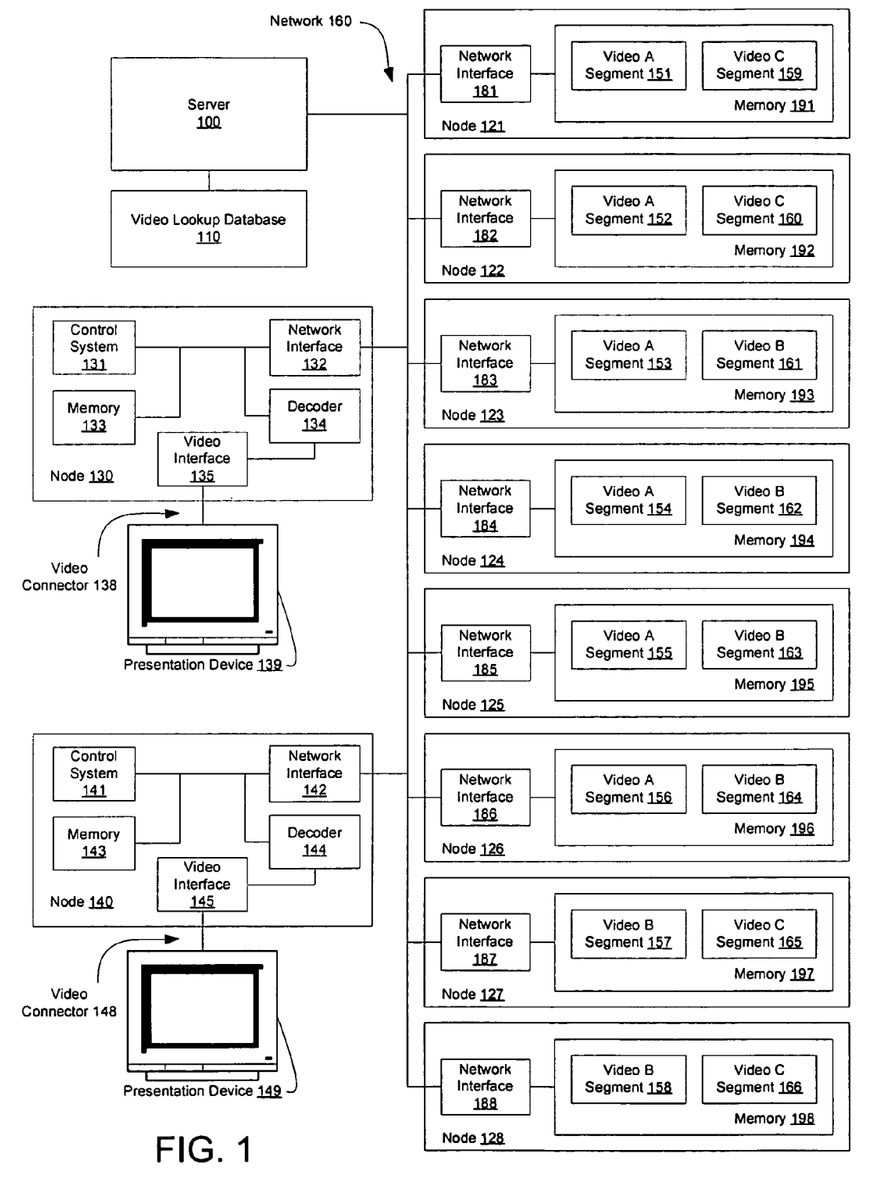
FIG. 1 illustrates a system for streaming a video according to one embodiment.

Embodiments may be implemented in a video on demand (VOD) system as illustrated generally in FIG. 1. The system includes nodes coupled through a network 160 to a server 100 that has a video lookup database 110. In one embodiment, the server 100 is operated by a VOD service provider.

Users of the video on demand service access the service through the network 160. A node 130 has a control system 131, a memory 133 and a decoder 134 coupled through a network interface 132 to the network 160. The node 130 has a video interface 135 coupled to the decoder 134 and coupled through a video connector 138 to a presentation device 139. In some embodiments, the node 130 is a box supplied by the VOD service provider. In other embodiments, the node 130 is a personal computer.

A user can request a video A, for example, through the control system 131. The user can submit that request using a remote control or a keyboard, for example. In response, the control system 131 initiates a video request through the network interface 132 onto the network 160. The server 100 is configured to respond to video requests from the nodes on the network 160. When a request is received, the server 100 accesses the video lookup database 110 to determine which of the nodes on the network 160 store segments associated with video A and are available to serve the segments to the node 130. In one embodiment, the server 100 allocates the nodes that are least likely to be needed for a subsequent video request based on, for example, the popularity of videos associated with the other segments stored on each node.

As an example, the video A is associated with six segments, a segment 151, a segment 152, a segment 153, a segment 154, a segment 155, and a segment 156. In one embodiment, any four of the six segments can be used to generate the video A. The relationship between the videos and the segments are described in more detail with reference to subsequent figures.

For example, the server 100 can allocate a node 121, a node 122, a node 123 and a node 124 in response to the request for the video A from the node 130. The node 121 has a memory 191 that is coupled to the network 160 through a network interface 181. The memory 191 stores the segment 151 corresponding to the video A and a segment 159 corresponding to a video C. A node 122 has a memory 192 that is coupled to the network 160 through a network interface 182. The memory 192 stores the segment 152 corresponding to the video A and a segment 160 corresponding to the video C. A node 123 as a memory 193 that is coupled to the network 160 through a network interface 183. The memory 193 stores the segment 153 corresponding to the video A and a segment 161 corresponding to the video B. A node 124 has a memory 194 that is coupled to the network 160 through a network interface 184. The memory 194 stores the segment 154 corresponding to the video A and a segment 162 corresponding to the video B.

After receiving the allocation of the nodes from the server 100, the network interface 132 communicates with the network interface 181 to receive the segment 151, the network interface 132 communicates with the network interface 182 to receive the segment 152, the network interface 132 communicates with the network interface 183 to receive the segment 153 and the network interface 132 communicates with the network interface 184 to receive the segment 154.

In one embodiment, the download bandwidth of the node 140 is at least four times the upload bandwidth of a typical node in the network 160. Thus, the network interface 132 can download all four segments from the network 160 at the combined rate that the network interface 181, the network interface 182, the network interface 183 and a network interface 184 can upload those four segments to the network 160. In one embodiment, the number of segments is chosen to be such that the concurrent download of all necessary segments is fast enough to enable playback of video in real time. In one embodiment, multiple segments can be downloaded from the same node if that node has enough upstream bandwidth to concurrently upload the multiple segments at the required rate.

The decoder 134 receives the four segments and generates the video according to methods described with reference to subsequent figures. A video interface 135 is coupled to receive the video from the decoder 134 and transmit the video through a video connector 138 to a presentation device 139. In one embodiment, the presentation device 139 is a television. Alternatively, the presentation device 139 is another device capable of audiovisual representation of the video. In some embodiments, the presentation device 139 is only capable of presenting video without sound. In other embodiments, the presentation device 139 is only capable of presenting sound without video.

Another user has a node 140 including a control system 141, a memory 143 and a decoder 144 coupled to a network interface 142 on the network 160. The node 140 has a video interface 145 coupled to the decoder 144 and coupled to a video connector 148 to a presentation device 149.

A user can request, for example, a video B through the control system 141. In response, the control system 141 initiates a video request through the network interface 142 onto the network 160. When a request is received, the server 100 accesses the video lookup database 110 to determine which of the nodes on the network 160 store segments associated with the video B and are available to serve the segments to the node 130.

The video B is associated with six segments: a segment 161, a segment 162, a segment 163, a segment 164, a segment 157 and a segment 158. In one embodiment, any four of the six segments can be used to generate the video B. If the request for video B happens while the node 123 and the node 124 are still serving the segments for video A as described above, the node 123 and the node 124 are temporarily unavailable to serve the segment 161 and the segment 162, respectively, for video B.

In response to the request for video B, the server 100 can allocate a node 125, a node 126, a node 127 and a node 128. The node 125 has a memory 195 that is coupled to the network 160 through a network interface 185. The memory 195 stores the segment 155 corresponding to the video A and the segment 163 corresponding to the video B. The node 126 has a memory 196 that is coupled to the network 160 through a network interface 186. The memory 196 stores a segment 156 corresponding to the video A and the segment 164 corresponding to the video B. A node 127 has a memory 197 that is coupled to the network 160 through a network interface 187. The memory 197 stores a segment 157 corresponding to the video B and the segment 165 corresponding to the video C. A node 128 has a memory 198 that is coupled to the network 160 through a network interface 188. The memory 198 stores a segment 158 corresponding to the video B and the segment 166 corresponding to the video C.

After receiving the allocation of the nodes from the server 100, the network interface 142 requests the segments from the nodes. The network interface 142 communicates with the network interface 185 to receive the segment 151. The network interface 142 communicates with the network interface 186 to receive the segment 152. The network interface 142 communicates with the network interface 187 to receive the segment 153. And the network interface 142 communicates with the network interface 188 to receive the segment 154.

The decoder 144 receives the four segments and decodes the four segments to generate the video according to methods described with reference to subsequent figures. A video interface 145 is coupled to receive the video from the decoder 144 and transmit the video through a video connector 148 to a presentation device 149. The presentation device 149 can be a device capable of audiovisual representation of the video.

Nodes 121-128 are illustrated to emphasize components used to serve segments in response to a video request according to the example video requests described above. In some embodiments, each of these nodes has a control system, decoder and video interface to provide the functionality described with reference to the node 130, for example. In some embodiments, the node 130 is configured to provide similar functionality as described with reference to the node 121, for example.

The example illustrated uses six independent segments. In other embodiments, a different number of segments may be used. In some embodiments, the same segment may be duplicated on multiple nodes to allow for more concurrent requests for the same video. In this example, any four of the six independent segments can be used to generate the video. In other embodiments, a different number of independent segments may be required. It will be apparent to one skilled in the art that duplicate segments cannot be used to establish the minimum number of segments to generate the video.

Because only some of the segments are required to generate the video, there is quite a bit of flexibility in terms on selecting combinations of nodes that can generate the video. As the number of segments increases so does the number of combinations of segments that can be used to generate the video.

Figure 2:
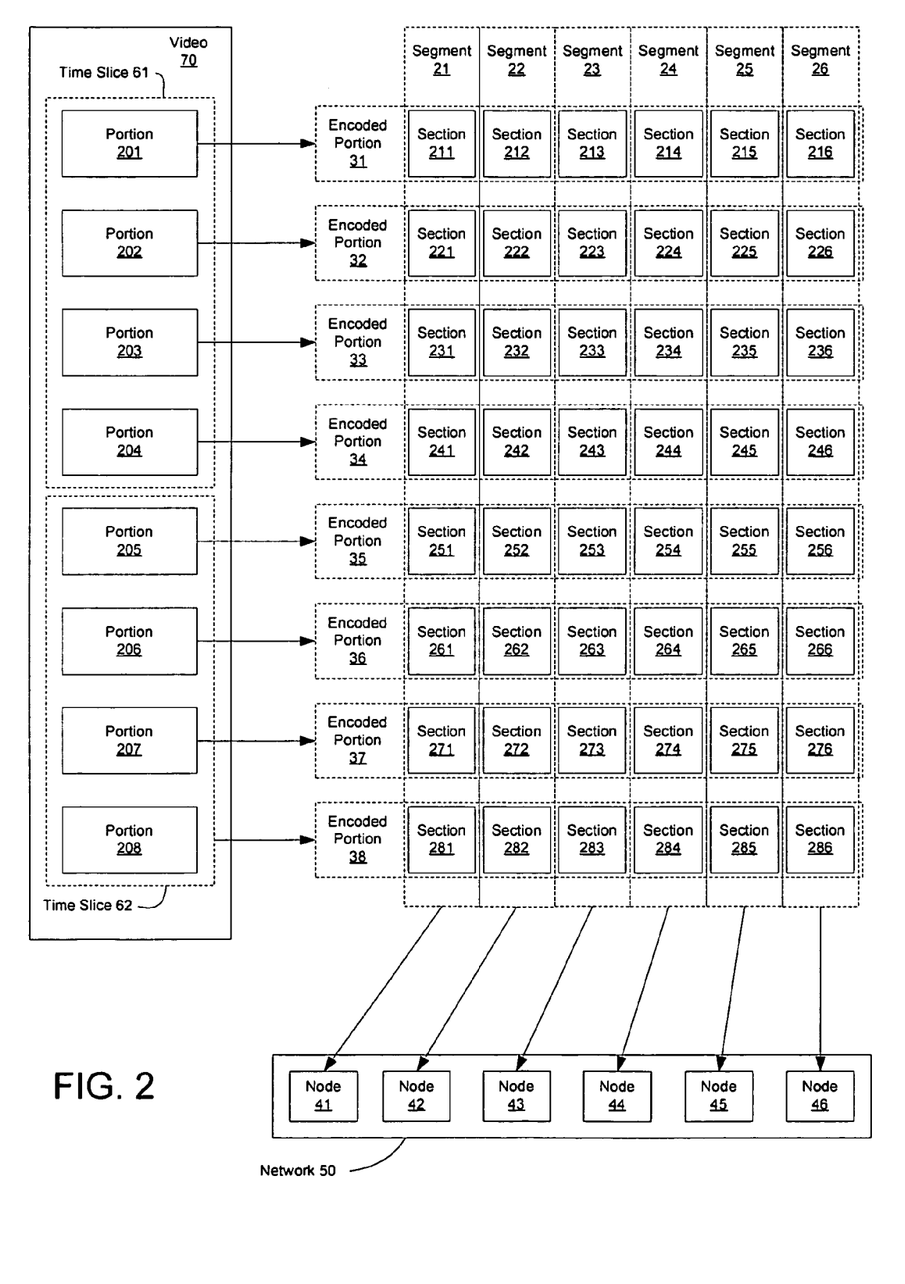
FIG. 2 shows a block diagram of one embodiment of an encoding system.

FIG. 2 is a block diagram illustrating one embodiment of an encoding system of the present invention.

A video 70 is the source of the video for the encoding process. The process is not limited to any particular video format. In some embodiments, the video 70 format can be Digital Video (DV) Encoder Type 1, DV Encoder Type 2, MPEG-1 (Moving Picture Experts Group format 1), MPEG-2, MPEG-4, or Real Video.

In one embodiment, the video 70 is processed as a sequence of time slices. The time slices are blocks of audiovisual data each including several portions. Two time slices are shown for illustrative purposes. A time slice 61 includes a portion 201, a portion 202, a portion 203 and a portion 204. A time slice 62 includes a portion 205, a portion 206, a portion 207 and a portion 208.

In one embodiment, each portion is encoded using an erasure code, such as a Hamming code, Reed-Solomon code, or Tornado code. An erasure code transforms data of n sections into encoded data with more than n sections such that the original data can be generated from any subset of the sections of the encoded data that include the minimum number of sections for that code. Strict subsets of the encoded data are any combination of less than all the sections of the encoded data. Rateless erasure codes can transform data of n sections into encoded data of an arbitrary number of sections. Erasure codes can also provide an error correcting function allowing the original data to be recovered despite a limited number of bit errors within the sections of the encoded message. In another embodiment, the erasure code used can be the identity function, i.e., the encoded segments are exactly identical to the original segments.

In the illustrated example, each portion is encoded into encoded portions having six blocks of which any four blocks can be used to generate the portion. The portion 201 is encoded into an encoded portion 31 having a section 211, a section 212, a section 213, a section 214, a section 215 and a section 216. The portion 202 is encoded into an encoded portion 32 having a section 221, a section 222, a section 223, a section 224, a section 225 and a section 226. The portion 203 is encoded into an encoded portion 33 having a section 231, a section 232, a section 233, a section 234, a section 235 and a section 236. The portion 204 is encoded into an encoded portion 34 having a section 241, a section 242, a section 243, a section 244, a section 245 and a section 246.

The portion 205 is encoded into an encoded portion 35 having a section 251 a section 252, a section 253, the section 254, section 255 and a section 256. The portion 206 is encoded into encoded portion 36 having a section 261, a section 262, a section 263, a section 264, a section 265 and a section 266. The portion 207 is encoded into an encoded portion 37 having a section 271, a section 272, a section 273, a section 274, a section 275 and a section 276. The portion 208 is encoded into an encoded portion 38 having a section 281, a section 282, a section 283, a section 284, a section 285 and a section 286.

A segment 21 is generated by assembling the section 211, the section 221, the section 231, the section 241, the section 251, the section 261, the section 271 and the section 281. A segment 22 is generated by assembling the section 212, the section 222, the section 232, the section 242, the section 252, the section 262, the section 272 and the section 282. A segment 23 is generated by assembling the section 213, the section 223, the section 233, the section 243, the section 253, the section 263, the section 273 and the section 283. A segment 24 is generated by assembling the section 214, the section 224, the section 234, the section 244, the section 254, the section 264, the section 274 and the section 284. A segment 25 is generated by assembling the section 215, the section 225, the section 235, the section 245, the section 255, the section 265, the section 275 and the section 285. A segment 26 is generated by assembling the section 216, the section 226, the section 236, the section 246, the section 256, the section 266, the section 276 and the section 286.

In this illustration, two time slices are shown, each with four portions. However, the same technique can be applied to an arbitrary number of time slices using more or less portions. Furthermore, the encoding process may generate more or less sections according to well-known methods.

The segments are distributed over a network 50 to be stored among a set of nodes. In one embodiment, these nodes are configured as described with reference to the block diagram of the node 130 shown in FIG. 1. The segment 21 is distributed to a node 41. The segment 22 is distributed to a node 42. The segment 23 is distributed to a node 43. The segment 24 is distributed to a node 44. The segment 25 is distributed to a node 45 and the segment 26 is distributed to a node 46.

Figure 3:
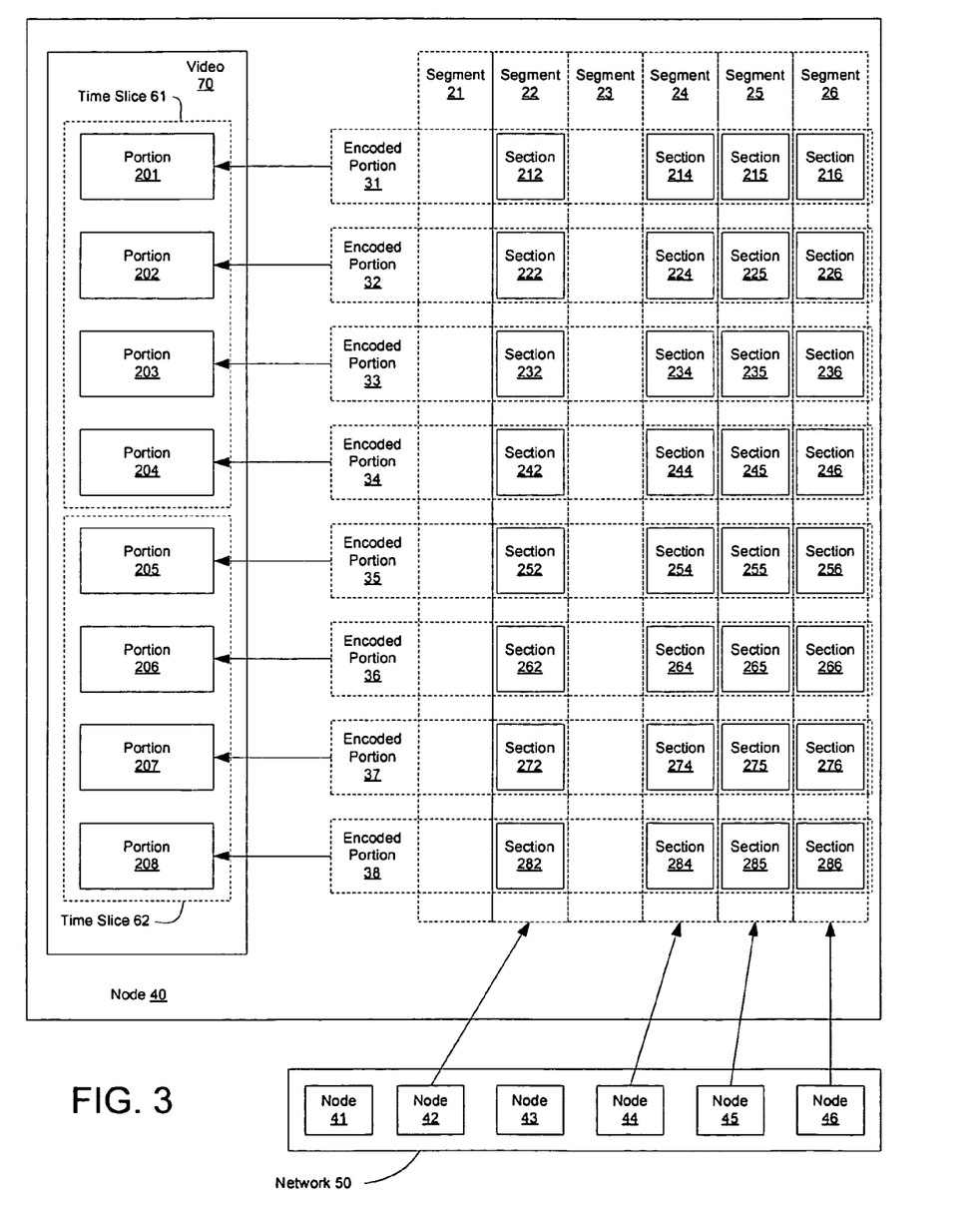
FIG. 3 shows a block diagram of one embodiment of a decoding system.

FIG. 3 is a block diagram illustrating one embodiment of a decoding system of the present invention.

In one embodiment, each portion is decoded using an erasure code. Any four of the six segments can be used to generate the video 70. A node 40 requests the video and four nodes are assigned to deliver the segments. In this example, the node 42, the node 44, the node 45 and the node 46 transmit the segment 22, the segment 24, the segment 25 and the segment 26, respectively, over the network 50 to the node 40.

In one embodiment, each portion is decoded using an erasure code. The section 212, the section 214, the section 215 and the section 216 of the encoded portion 31 are decoded to generate the portion 201. The section 222, the section 224, the section 225 and the section 226 of the encoded portion 32 is decoded to generate the portion 202. The section 232, the section 234, the section 235 and a section 236 of the encoded portion 33 are decoded to generate the portion 203. The section 242, the section 244, the section 245 and the section 246 of the include portion 204 are decoded to generate the portion 204. The portion 201, the portion 202, the portion 203 and the portion 204 are assembled to generate the time slice 61.

The section 252, the section 254, the section 255 and the section 256 of the encoded portion 35 are decoded to generate the portion 205. The section 262, the section 264, the section 265 and the section 266 of the encoded portion 36 are decoded to generate the portion 206. The section 272, the section 274, the section 275 and the section 276 of the include portion of the seven are decoded to generate the portion 207. The section 282, the section 284, the section 285 and a section 286 of the encoded portion 38 are decoded to generate the portion 208. The portion 205, the portion 206, the portion 207 and the portion 208 are assembled to generate the time slice 62.

Figure 4:
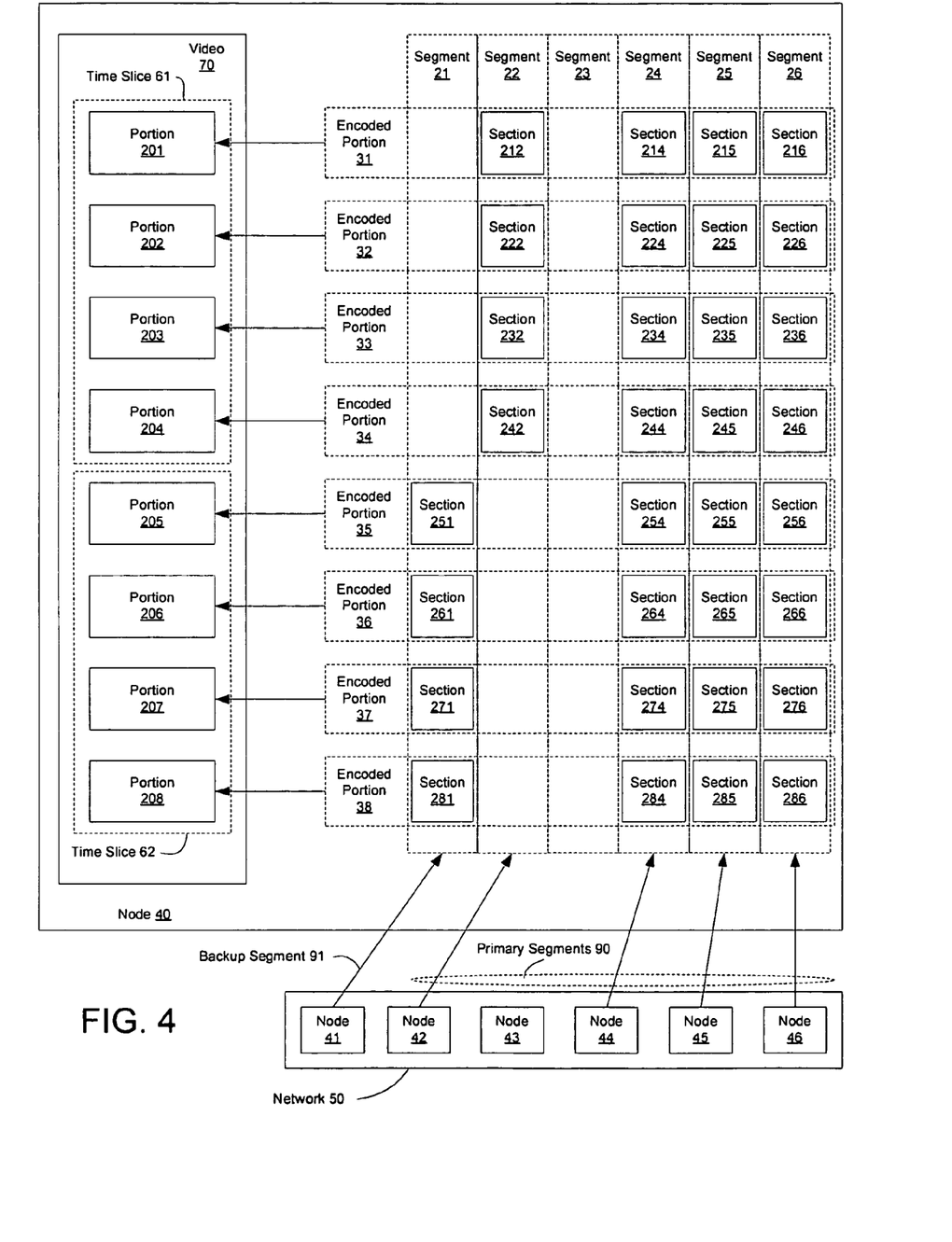
FIG. 4 shows a block diagram of a decoding system using primary segments and a backup segment according to one embodiment.

FIG. 4 is a block diagram illustrating another embodiment of a decoding system of the present invention.

In one embodiment, a set of primary segments 90 and a backup segment 91 are allocated in response to a video request. The backup segment 91 can be used to substitute for one of the primary segments 90 in response to a failure, for example, of a node transmitting one of the primary segments 90. In other embodiments, additional backup segments can be allocated to a video request.

In this example, any four of the six segments can be used to generate the video 70. The node 40 requests a video. The set of primary segments 90 allocated to the video request include the segment 22, the segment 24, the segment 25 and a segment 26. The backup segment 91 allocated to the video request is the segment 21. The node 42, the node 44, the node 45 and the node 46 transmit the segment 22, the segment 24, the segment 25 and the segment 26, respectively, over the network 50 to the node 40.

The section 212, the section 214, the section 215, the section 216 of the encoded portion 31 are decoded to generate the portion 201. The section 222, the section 224, the section 225 and the section 226 of the encoded portion 32 is decoded to generate the portion 202. The section 232, the section 234, the section 235 and the section 236 of the encoded portion 33 are decoded to generate the portion 203. The section 242, the section 244, the section 245 and the section 246 of the include portion 204 are decoded to generate the portion 204. The portion 201, the portion 202, the portion 203 and the portion 204 are assembled to generate the time slice 61.

In this example, the backup segment 91 replaces the segment 22 after time slice 61 is processed. The backup segment can be used instead of one of the primary segments when, for example, the node transmitting one of the primary segments 90 malfunctions, is disconnected from the network, or loses power. The node 42 stops transmitting the segment 22. In response, the node 41 starts transmitting the segment 21 over the network 50 to the node 40.

The section 251, the section 254, the section 255 and the section 256 of the encoded portion 35 are decoded to generate the portion 205. The section 261, the section 264, the section 265 and the section 266 of the encoded portion 36 are decoded to generate the portion 206. The section 271, the section 274, the section 275 and the section 276 of the include portion of the seven are decoded to generate the portion 207. The section 281, the section 284, the section 285 and the section 286 of the encoded portion 38 are decoded to generate the portion 208. The portion 205, the portion 206, the portion 207 and the portion 208 are assembled to generate and the time slice 62.

Figure 5:
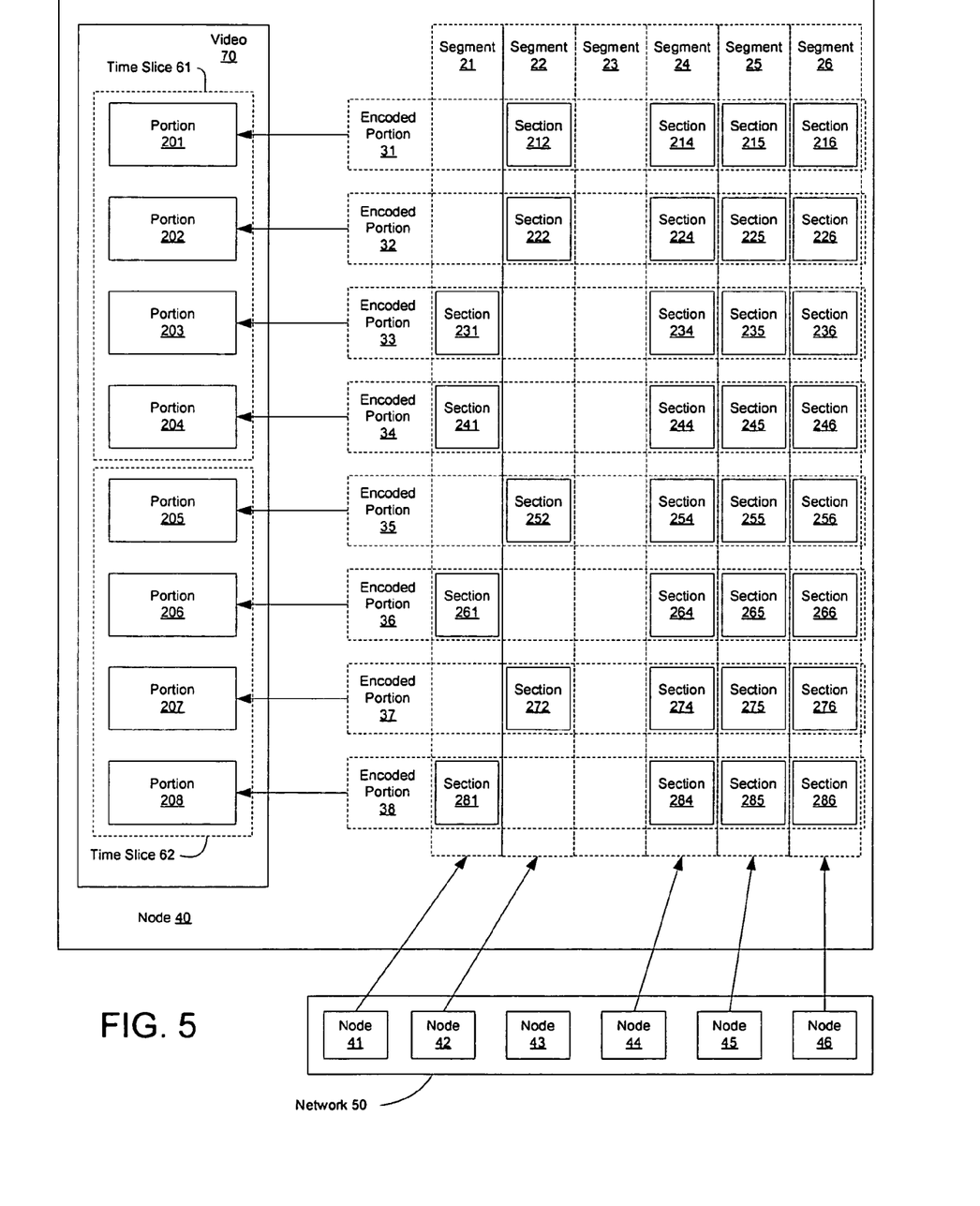
FIG. 5 shows a block diagram of one embodiment of a decoding system using different subsets of the segments for some encoded portions.

FIG. 5 is a block diagram illustrating another embodiment of a decoding process of the present invention.

The node 40 requests a video. In this example, a set of segments are allocated to a video request and the subset of the set of segments used for at least two of the portions in a time slice are different. In one embodiment, any four of the six segments can be used to generate the video 70. In this example, the node 44, the node 45 and the node 46 transmit the segment 24, the segment 25 and the segment 26, respectively, over the network 50 to the node 40.

The section 212, the section 214, section 215 and section 216 of the encoded portion 31 are decoded to generate the portion 201. The section 222, the section 224, the section 225 in the section 226 of the include portion 32 or decoded to generate the portion 202. The section 231, the section 234, the section 235 and section 236 of the include portion of the three are decoded to generate the portion 203. The section 241, the section 244, the section 245 and the section 246 of the include portion 34 decoded to generate the portion 204. The portion 201, the portion 202, the portion 203 and the portion 204 are assembled to generate the time slice 61.

The section 252, the section 254, the section 255 and the section 256 of the encoded portion 35 are decoded to generate the portion 205, the section 261, the section 264, the section 265 and a section 266 of encoded portion 36 are decoded to generate the portion 206. The section 272, the section 274, the section 275 in the section 276 of the include portion 37 are decoded to generate the portion 207. 285 in the section 286 of the include portion 38 are decoded to generate the portion 208. The portion 205, the potion 206, the portion 207 and the portion 208 are assembled to generate the time slice 62.

Figure 6:
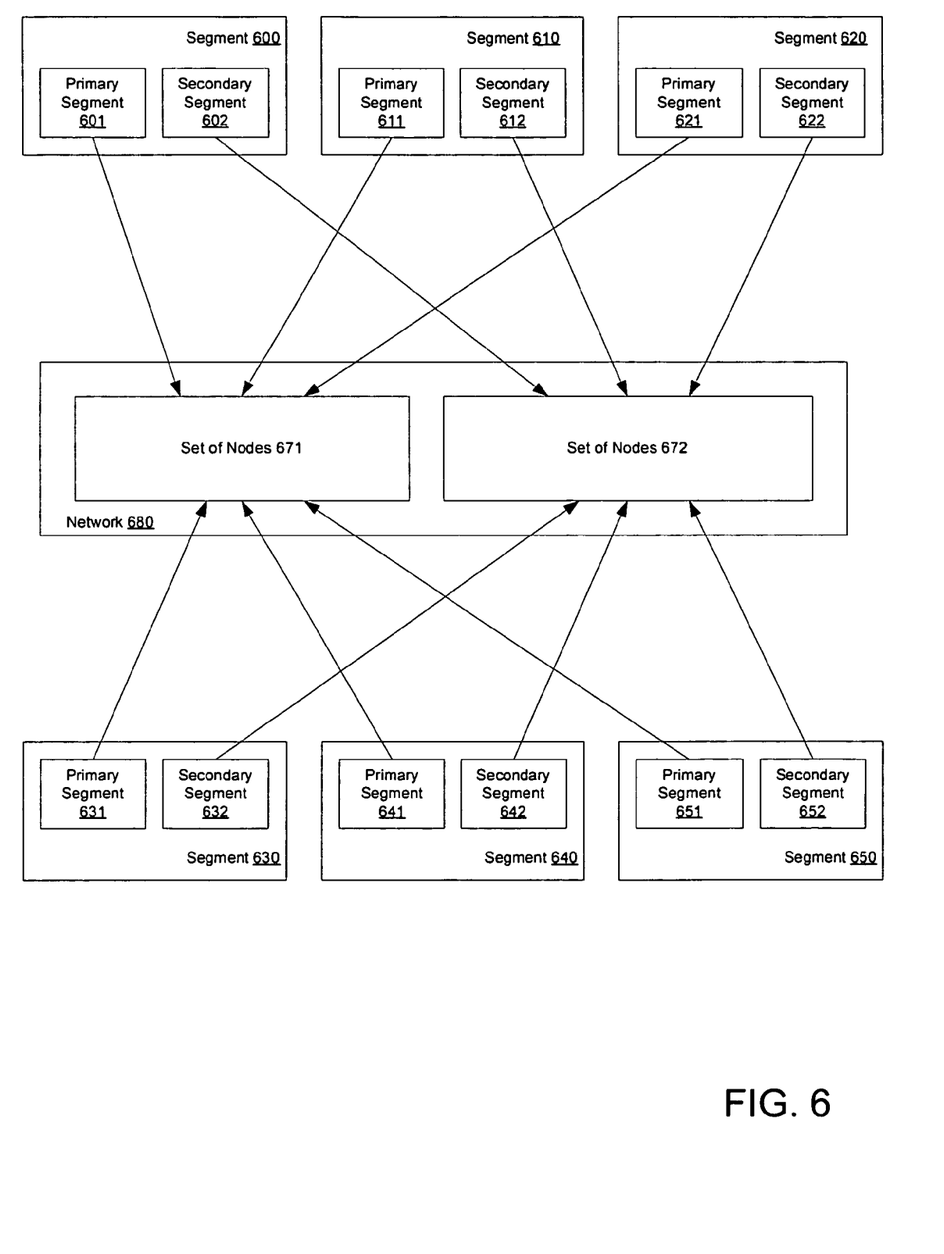
FIG. 6 shows a block diagram of the distribution of primary and secondary segments according to one embodiment.

FIG. 6 shows a block diagram of the distribution of primary and secondary segments according to one embodiment of the invention.

In one embodiment, each of the segments associated with a video are split into a primary segment and a secondary segment. The primary segment corresponds to the first half of the playback duration of the video. The secondary segment corresponds to the second half of the playback duration of the video.

A segment 600 includes a primary segment 601 and a secondary segment 602. A segment 610 includes the primary segment 611 and a secondary segment 612. A segment 620 includes a primary segment 621 and a secondary segment 622. A segment 630 includes a primary segment 631 and a secondary segment 632. A segment 640 includes a primary segment 641 and a secondary segment 642. A segment 650 includes a primary segment 651 and a secondary segment 652.

The primary segment 601, the primary segment 611, the primary segment 621, the primary segment 631, the primary segment 641 in the primary segment 651 are distributed over a network 680 to a set of nodes 671. The secondary segment 602, the secondary segment 612, the secondary segment 622, the secondary segment 632, the secondary segment 642 and a secondary segment 652 are distributed over a network 680 a set of nodes 672. In one embodiment, the set of nodes 671 is not disjoint from the set of nodes 672.

Nodes requesting a streaming video corresponding to the first half of the video are assigned nodes from the set of nodes 671. Nodes requesting a streaming video corresponding to the second half of the video are assigned nodes from the set of nodes 672. Once a node completes viewing the first half of the video, it is assigned nodes from the set of nodes 672 so that it can start viewing the second half. This assignment is done in advance to ensure that there is no interruption in movie watching as a node transitions from the first half to the second half.

The division of segments into primary and secondary segments can, in the best case, double the peak capacity of concurrent streams of that video for the same average storage used per node. Observe that, at any given point in time, -half the nodes receiving a particular video could be streaming the first half of the video from the set of nodes 671 and half the nodes receiving that video could be streaming the second half of that video from the set of nodes 672. Since different nodes are streaming each half of the video, the peak capacity of concurrent streams of that video doubles as compared to the case in which the whole video is served by the same node.

Approximately the same storage capacity is used, allowing for some overhead, since twice as many nodes store half of the video as compared to the case where the whole video is served by the same node. Since less to space is taken for each video stored on a particular node, more video selections can be stored on a node having a given memory capacity. This allows for more flexibility in the allocation of nodes in response to video requests.

In other embodiments, the video is broken into three or more periods and segments corresponding to each of the periods are distributed among three or more sets of nodes. In some embodiments, breaking the video into more periods can further increase flexibility in the allocation of nodes in response to video requests and the peak capacity of concurrent streams of a particular video.

Figure 7:
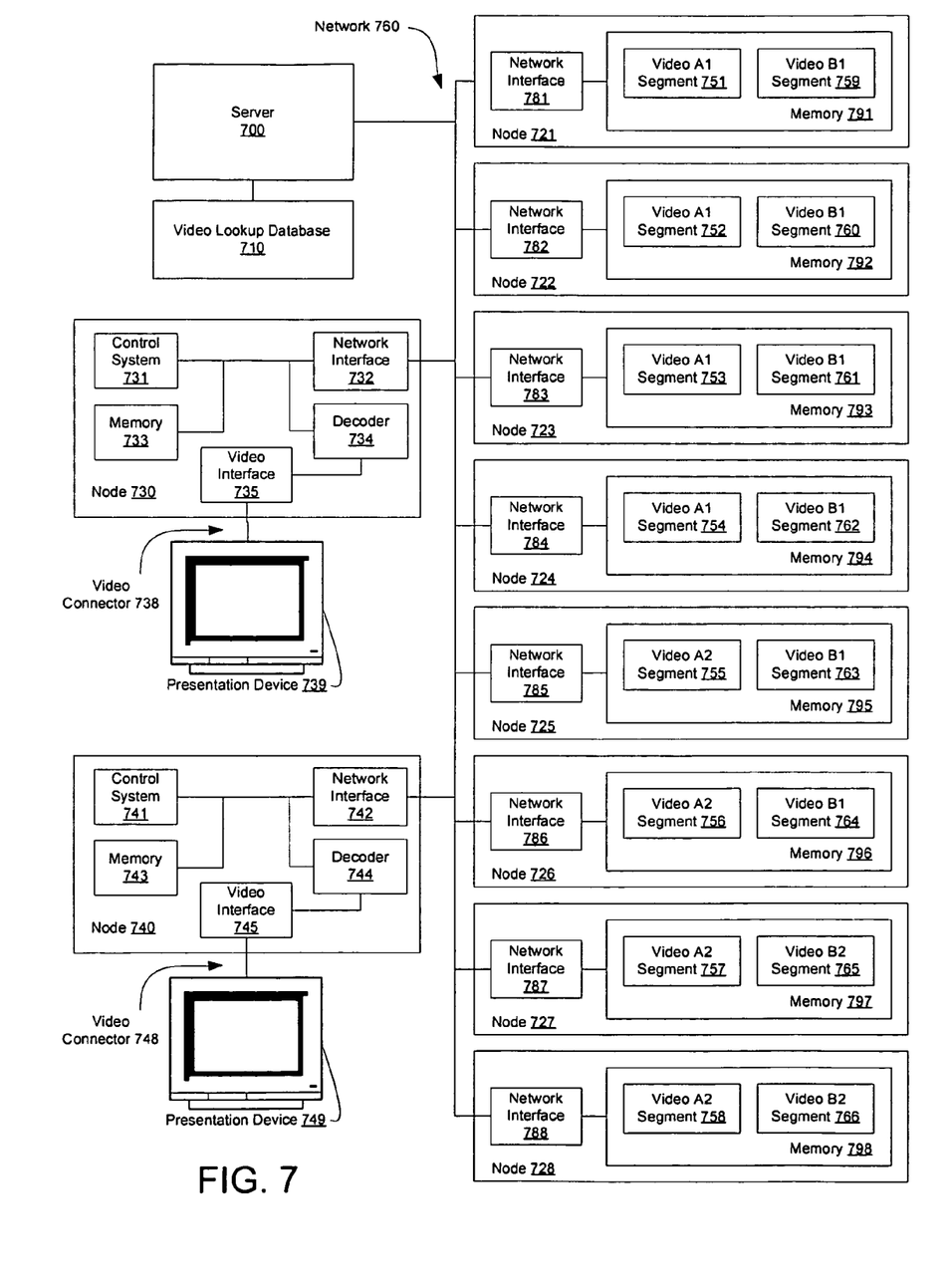
FIG. 7 illustrates a system using primary and secondary segments for streaming a video according to one embodiment.

Embodiments of the invention can be implemented in a VOD system using primary and secondary segments as illustrated generally in FIG. 7. The system includes nodes coupled through a network 760 to a server 700 that has a video lookup database 710.

Users of the video on demand service access the service through the network 760. A node 730 has a control system 731, a memory 733 and a decoder 734 coupled to a network interface 732 to the network 760. The node 730 has a video interface 735 coupled to the decoder 734 and coupled through a video connector 738 to a presentation device 739.

For example, a user can request a video A through the control system 731. In response, the control system 731 initiates a video request for the first period of the video A through the network interface 732 onto the network 760. The server 700 is configured to respond to video requests from the nodes on the network 760. When a request is received, the server 700 accesses the video lookup database 710 to determine which of the nodes on the network 760 store segments associated with the first period of the video A and are available to serve the segments to the node 730.

The server can allocate a node 121, a node 122, a node 123 and a node 124, for example, to serve the first period of the video. The node 721 has a memory 791 that is coupled to the network 760 through a network interface 781. The memory 791 stores the segment 751 corresponding to the first period of video A and a segment 759 corresponding to first period of video B. A node 722 has a memory 792 that is coupled to the network 760 through a network interface 782. The memory 792 stores the segment 752 corresponding to second period of the video A and a segment 760 corresponding to first period of the video B. A node 723 as a memory 793 that is coupled to the network 760 through a network interface 783. The memory 793 stores the segment 763 corresponding to the second period of the video A and a segment 761 corresponding to the second period of the video B. A node 724 has a memory 794 that is coupled to the network 760 through a network interface 784. The memory 794 stores the segment 754 corresponding to the second period of the video A and a segment 762 corresponding to the first period of the video B.

After receiving the allocation of the nodes from the server 700, the network interface 732 communicates with the network interface 781 to receive the segment 751, communicates with the network interface 782 to receive the segment 752, communicate with the network interface 783 to receive the segment 753 and communicates with the network interface 784 to receive the segment 754.

The decoder 734 receives the four segments and generates the video according to methods described with reference to other figures. A video interface 735 is coupled to receive the video from the decoder 734 and transmit the video through a video connector 738 and to a presentation device 739. In one embodiment, the presentation device 739 is a television. Alternatively, the presentation device 739 is another device cable of audiovisual representation of the video.

When streaming the first period of video A is almost complete, the control system 731 initiates a video request for the second period of video A through the network interface 732 onto the network 760. The server 700 accesses the video lookup database 710 to determine which of the nodes on the network 760 store segments associated with the second period of the video A and are available to serve the segments to the node 730.

The server can allocate a node 125, a node 126, a node 127 and a node 128, for example, to serve the first period of the video. The node 721 has a memory 795 that is coupled to the network 760 through a network interface 785. The memory 795 stores the segment 755 corresponding to the second period of video A and a segment 763 corresponding to the first period of video B. A node 726 has a memory 796 that is coupled to the network 760 through a network interface 786. The memory 796 stores the segment 756 corresponding to second period of the video A and a segment 764 corresponding to first period of the video B. A node 727 has a memory 797 that is coupled to the network 760 through a network interface 787. The memory 797 stores the segment 765 corresponding to the second period of the video A and a segment 765 corresponding to the second period of the video B. A node 728 has a memory 798 that is coupled to the network 760 through a network interface 788. The memory 798 stores the segment 758 corresponding to the second period of the video A and a segment 766 corresponding to the second period of the video B.

After receiving the allocation of the nodes from the server 700, the network interface 732 communicates with the network interface 785 to receive the segment 755, communicates with the network interface 786 to receive the segment 756, communicate with the network interface 787 to receive the segment 757 and communicates with the network interface 788 to receive the segment 758. The nodes 721-725 are now released to be available for allocation to stream another video as the newly allocated nodes are streaming the second portion of the video A to the node 730.

The decoder 734 receives the four segments and generates the video. The video is transmitted through the video interface 735 and through the video connector 738 to the presentation device 739.

A node 740 has a control system 741, a memory 743 and a decoder 744 coupled to a network interface 742 in the network 760. The node 740 has a video interface 745 coupled to the decoder 744 and coupled to a video connector 748 to a presentation device 749.

Other users of the VOD service can concurrently access the service through the network 760. A node 740 has a control system 741, a memory 743 and a decoder 744 coupled to a network interface 742 to the network 760. The node 740 has a video interface 745 coupled to the decoder 744 and coupled through a video connector 748 to a presentation device 749.

The user can request a video A, for example, through the control system 141. In response, the control system 141 initiates a video request through the network interface 142 onto the network 160. When a request is received, the server accesses the video lookup database 110 to determine which of the nodes on the network 160 store segments associated with first period of the video A and are available to serve the segments to the node 140. For example, the server 700 can allocate a node 721, a node 722, a node 723 and a node 724 to respond to the request for the first period of video A from the node 130.

After receiving the allocation of the nodes from the server 700, the network interface 742 communicates with the network interface 781 to receive the segment 751, communicates with the network interface 782 to receive the segment 752, communicate with the network interface 783 to receive the segment 753 and communicates with the network interface 784 to receive the segment 754. The decoder 734 receives the four segments and generates the video according to methods described with reference to subsequent figures. A video interface 735 is coupled to receive the video from the decoder 734 and transmit the video through a video connector 738 and to a presentation device 739.

Figure 8:
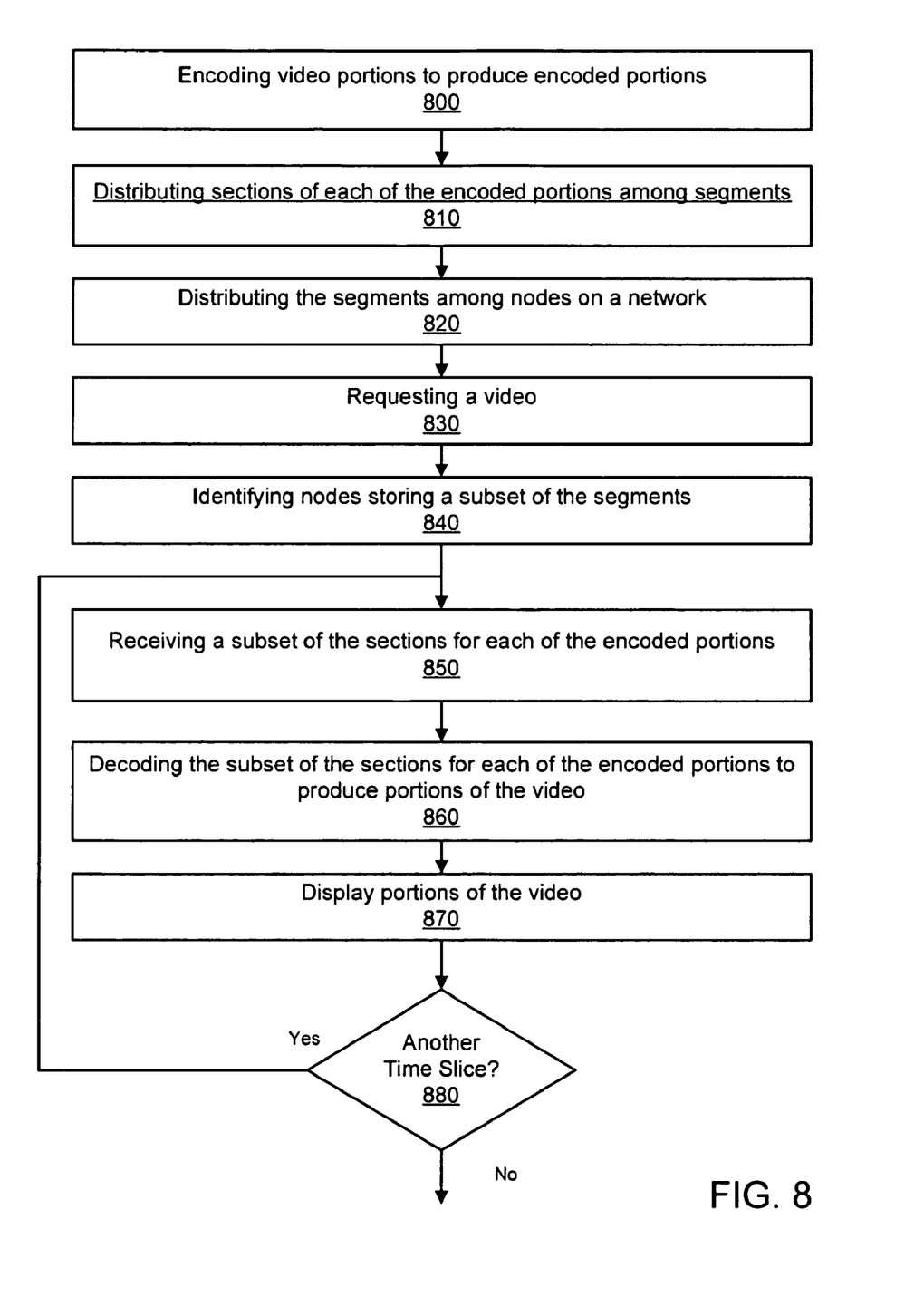
FIG. 8 is a flow chart that that he think illustrates a method of streaming a video according to one embodiment.

FIG. 8 is a flow chart that illustrates one embodiment of a method in accordance with the disclosure herein.

In step 800, the video portions are encoded to generate encoded portions each having multiple sections. In one embodiment, the encoding process is performed using an erasure code, such as a Hamming code, a Reed-Solomon code or a Tornado code.

In step 810, the sections of each of the encoded portions are distributed among a set of segments.

In step 820, the segments are distributed among nodes on a network. In some embodiments, the encoding process is performed as illustrated with reference to FIG. 2.

In step 830 a video is requested. In one embodiment, the node requests the video in response to a user request submitted through a remote control or keyboard.

In step 840 the nodes storing a subset of the segments are identified. In one embodiment, a server accesses a video lookup database to determine which of the nodes on the network store segments associated with the requested video and are available to serve the segments. In one embodiment, the server allocates the nodes that are least likely to be needed for a subsequent video request based on, for example, the popularity of videos associated with the other segments stored on each node.

In step 850, a subset of the sections for each of the encoded portions are received.

In step 860, the subset of the sections for each of the encoded portions is decoded to generate portions of the video. In some embodiments, the decoding process is performed as illustrated with reference to FIGS. 3, 4 and 5.

In step 870, the portions of the video are presented. In one embodiment, the video is displayed on a television or other device capable of audiovisual representation. In some embodiments, the video is presented without sound. In other embodiments, the video is presented without images.

In step the 880, it is determined whether another time slice is available. If yes, step 850 is performed to process subsequent time slices. If no, the flow chart is completed.

What is claimed is:

1. A system for streaming a movie on demand over a network comprising:
a server configured to: (i) encode a plurality of portions of the movie to a plurality of encoded portions so that each encoded portion has a plurality of sections, (ii) generate a plurality of segments, each segment comprising a section of some of the plurality of encoded portions, and (iii) distribute the plurality of segments to some of a plurality of nodes, wherein the plurality of portions corresponds to a time slice of the movie, and wherein the number of the plurality of portions of the time slice is approximately equal to a ratio of a predetermined download bandwidth to a predetermined upload bandwidth;
an apparatus comprising:
a network interface coupled to the network;
a control system coupled to the network interface and configured to:
(i) initiate a request for the movie, and (ii) communicate with one or more nodes of the plurality of nodes to receive a subset of the plurality of segments; and
a decoder coupled to the network interface and configured to decode a subset of the plurality of sections so that less than all of the plurality of sections are used to play back the portions of the movie;
wherein the apparatus enables (i) the movie to be played back in its entirety, and (ii) each portion of the movie to be played back in its entirety, without using all of the plurality of sections of that portion; and
a presentation device coupled to the apparatus, the presentation device being configured to display the plurality of portions of the movie for play back;
wherein the server is further configured to, in response to the request for the movie, identify the one or more nodes of the plurality of nodes that store the subset of the plurality of sections in order to enable the control system of the apparatus to receive the subset of the plurality of segments from the one or more nodes.

2. The system of claim 1, wherein the apparatus further comprises a memory configured to store a second plurality of segments corresponding to a plurality of movies, and wherein the control system is further configured to transfer one of the second plurality of segments through the network in response to a request.

3. The system of claim 1, wherein the movie is encoded using an erasure code.

4. The system of claim 1, wherein each section from the subset of the plurality of sections is from a respective segment from the subset of the plurality of segments.

5. The system of claim 1, wherein at least two sections of the subset of the plurality of sections are from different subsets of the plurality of segments.

6. The system of claim 1, wherein the plurality of portions of the movie comprise a first plurality of portions corresponding to a first period of the movie and a second plurality of portions corresponding to a second period of the movie, and wherein the plurality of encoded portions comprises a first plurality of encoded portions corresponding to the first period of the movie and a second plurality of encoded portions corresponding to the second period of the movie.

7. The system of claim 6, wherein the subset of the plurality of segments comprises a plurality of primary segments and a backup segment, all of the plurality of sections corresponding to the first period being from the plurality of primary segments and at least one of the plurality of sections corresponding to the second period being from the backup segment.

8. The system of claim 7, wherein the control system of the apparatus is further configured to use the backup segment in response to a fault in one of the one or more nodes supplying one of the plurality of primary segments.

9. The system of claim 6, wherein the subset of the plurality of segments comprises a plurality of primary segments and a plurality of secondary segments, the subset of the plurality of sections from the first plurality of encoded portions being from the plurality of primary segments and the subset of the plurality of sections from the second plurality of encoded portions being from the plurality of secondary segments.

10. The system of claim 9, wherein the first period and the second period have approximately the same playback duration.

11. The system of claim 9, wherein the movie has a playback duration, the first period and the second period having a duration that is approximately half the playback duration.

12. An apparatus for streaming a movie on demand comprising:
   a network interface;
   a control system coupled to the network interface and configured to:
      (i) send a request for the movie to a server, the movie having a plurality of portions that are encoded into a plurality of encoded portions, each encoded portion having a plurality of sections, wherein each segment of a plurality of segments comprises a section of some of the plurality of encoded portions, and wherein the plurality of portions corresponds to a time slice of the movie, and wherein the number of the plurality of portions of the time slice is approximately equal to a ratio of a predetermined download bandwidth to a predetermined upload bandwidth,
      (ii) communicate with one or more nodes of a plurality of nodes distributed among a network, the one or more nodes being identified by the server in response to the request for the movie, and
      (iii) receive a subset of the plurality of segments from the one or more nodes;
   a decoder coupled to the network interface and configured to decode a subset of the plurality of sections so that less than all of the plurality of sections are used to play back the portions of the movie;
   a video interface coupled to the decoder and configured to transmit the plurality of portions to a display device for play back;
   wherein the apparatus enables (i) the movie to be played back in its entirety, and (ii) each portion of the movie to be played back in its entirety, without using all of the plurality of sections of that portion.

13. The apparatus of claim 12, further comprising a memory configured to store a second plurality of segments corresponding to a plurality of movies, and wherein the control system is further configured to transfer one of the second plurality of segments through the network interface in response to a network request.

14. The apparatus of claim 12, wherein the movie is encoded using an erasure code.

15. The apparatus of claim 12, wherein each section from the subset of the plurality of sections is from a respective segment from the subset of the plurality of segments.

16. The apparatus of claim 12, wherein at least two sections of the subset of the plurality of sections are from different subsets of the plurality of segments.

17. The apparatus of claim 12, wherein the plurality of portions of the movie comprise a first plurality of portions corresponding to a first period of the movie and a second plurality of portions corresponding to a second period of the movie, and wherein the plurality of encoded portions comprises a first plurality of encoded portions corresponding to the first period of the movie and a second plurality of encoded portions corresponding to the second period of the movie.

18. The apparatus of claim 17, wherein the subset of the plurality of segments comprises a plurality of primary segments and a backup segment, all the plurality of sections corresponding to the first period being from the plurality of primary segments and at least one of the plurality of sections corresponding to the second period being from the backup segment.

* * * * *